Nov. 21, 1950  H. N. BANEY ET AL  2,531,317
SHAFT CONCENTRICITY TESTING AND ASSORTING MACHINE
Filed March 2, 1948  6 Sheets-Sheet 4
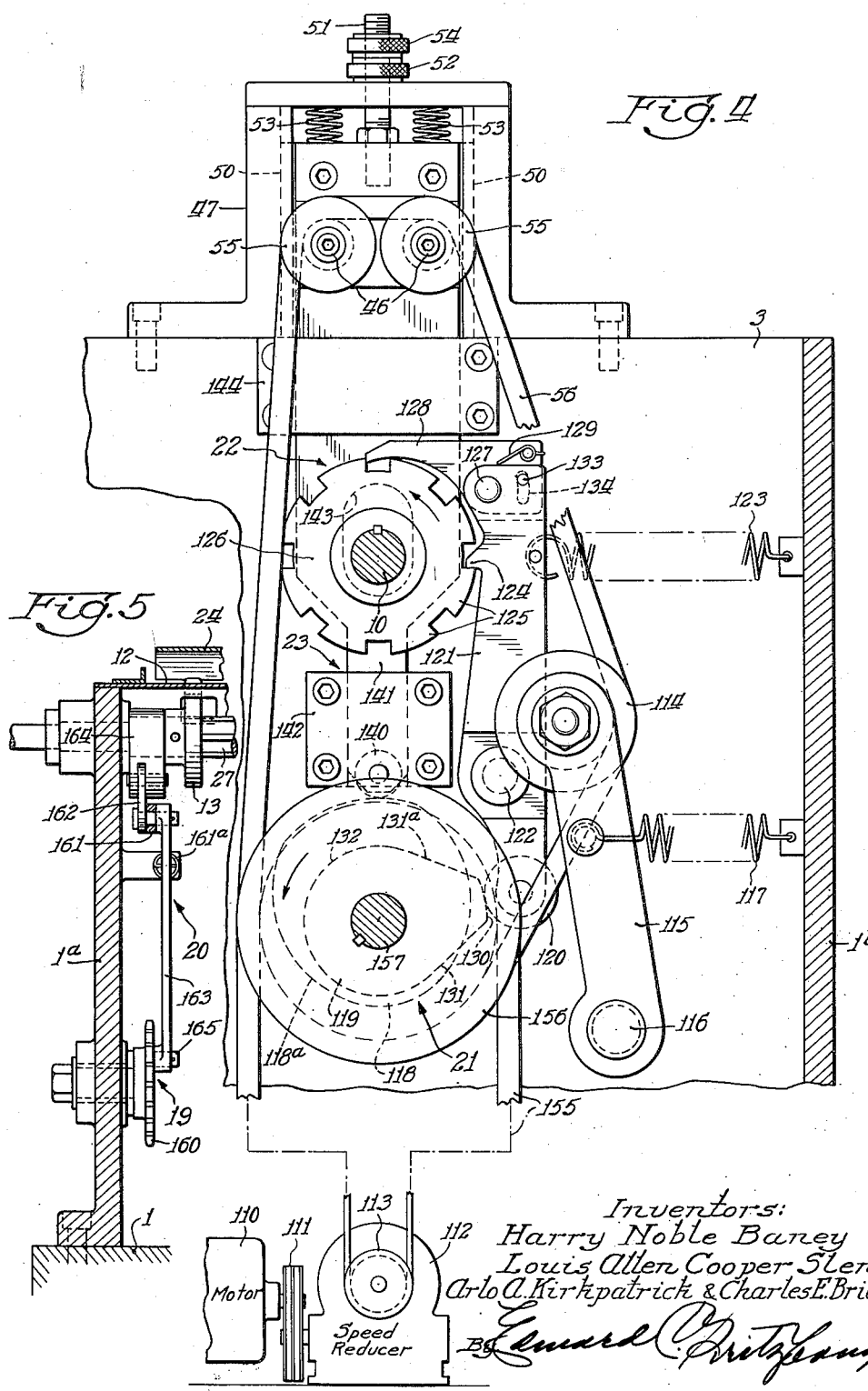

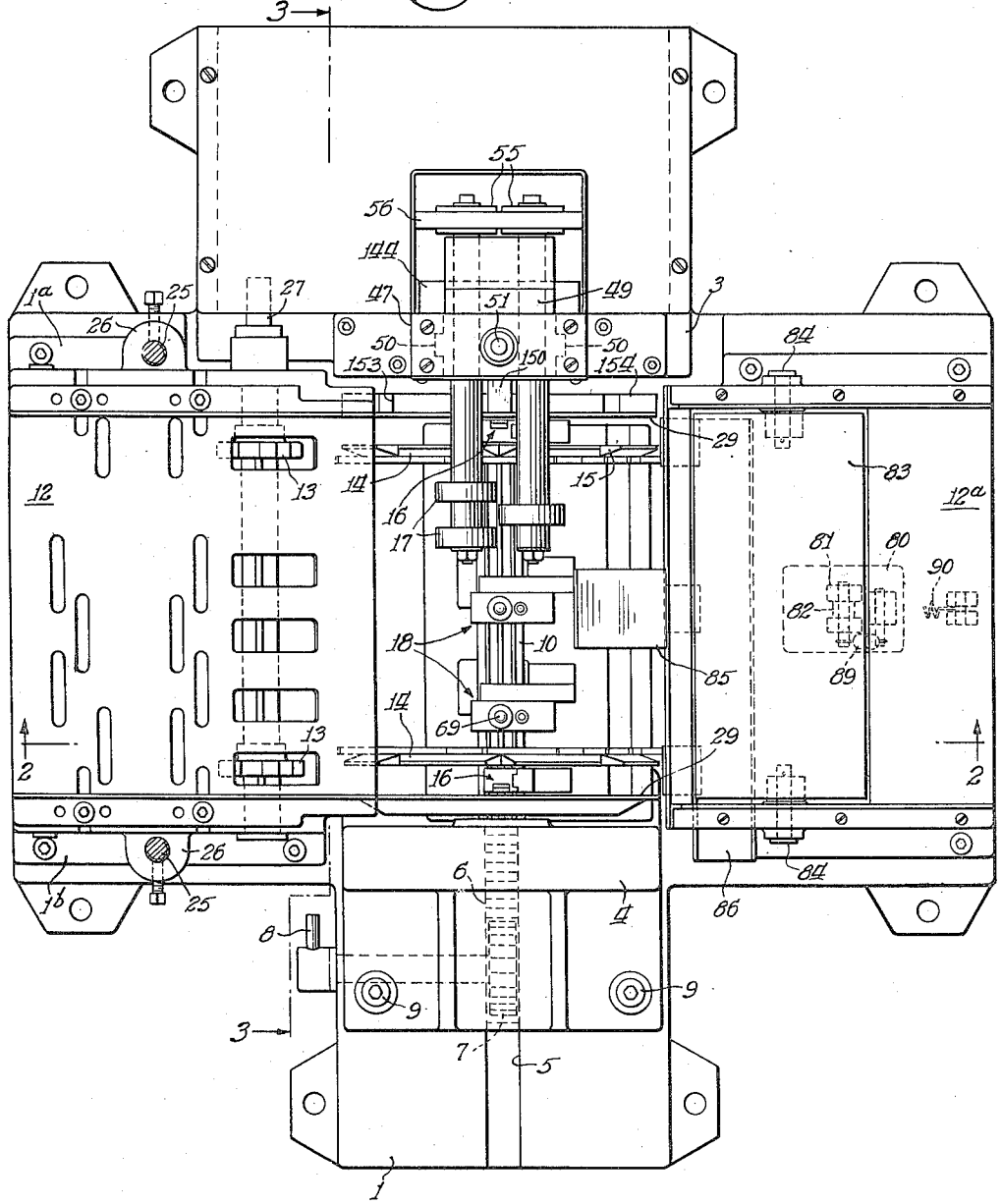

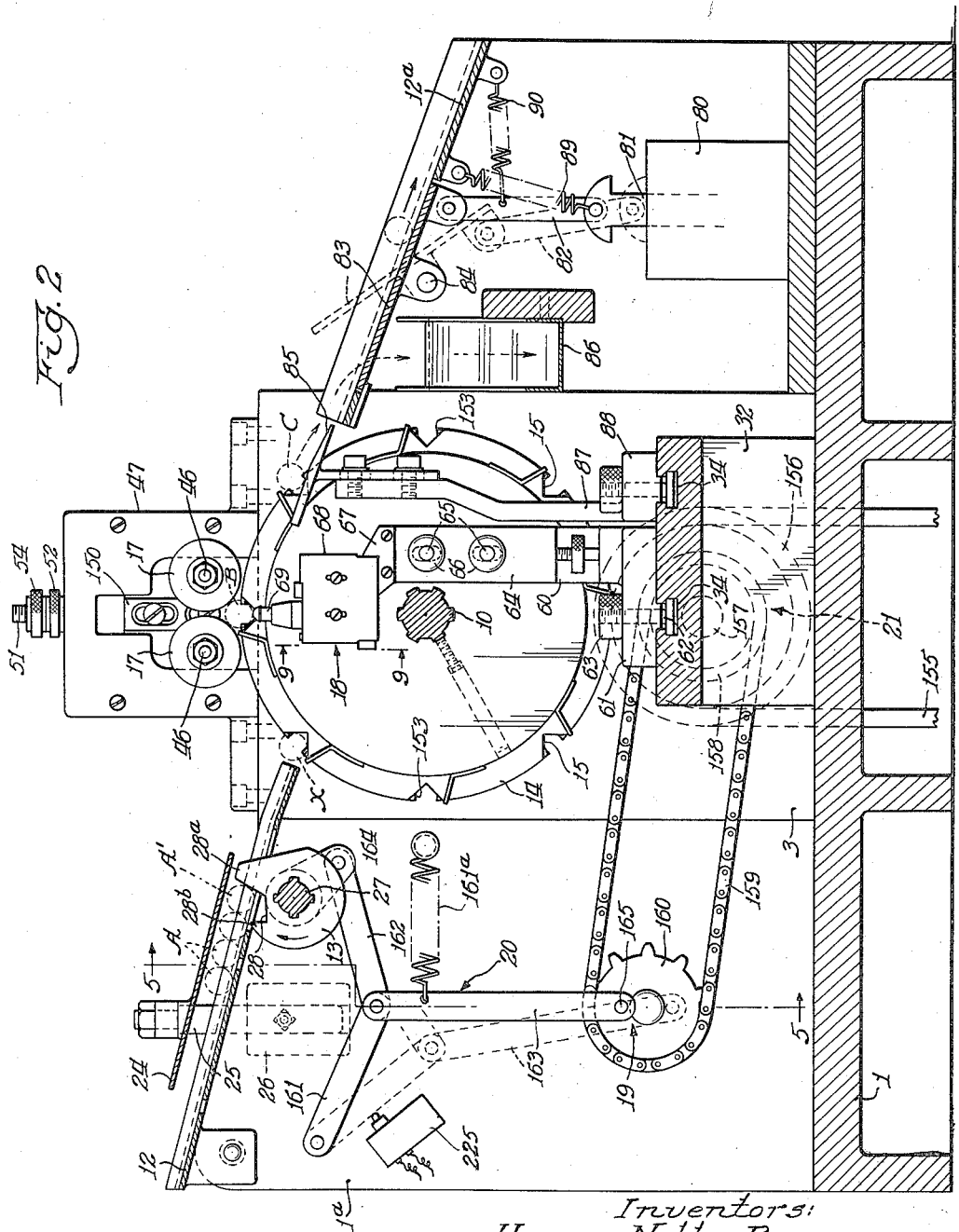

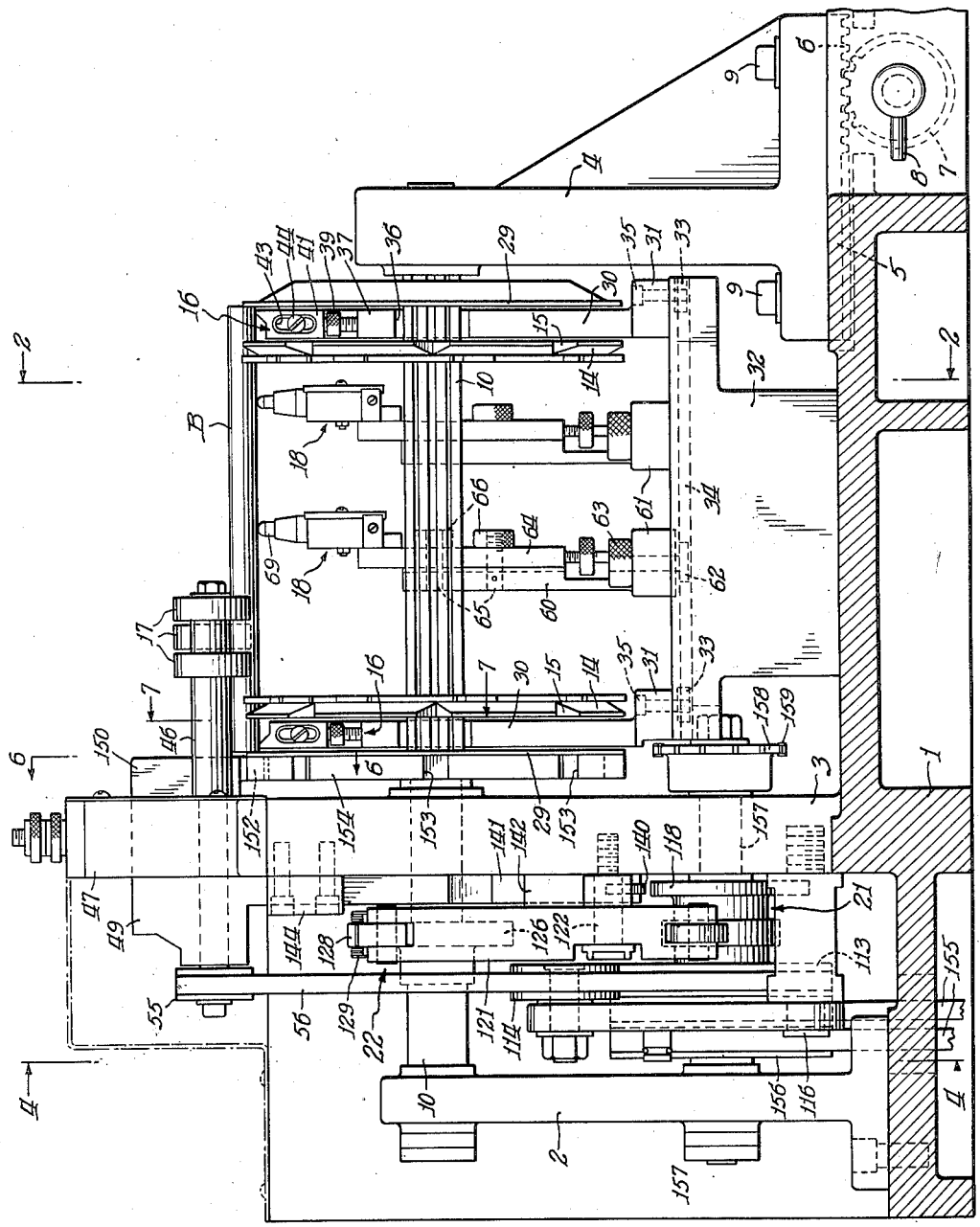

Nov. 21, 1950    H. N. BANEY ET AL    2,531,317
SHAFT CONCENTRICITY TESTING AND ASSORTING MACHINE
Filed March 2, 1948    6 Sheets-Sheet 5
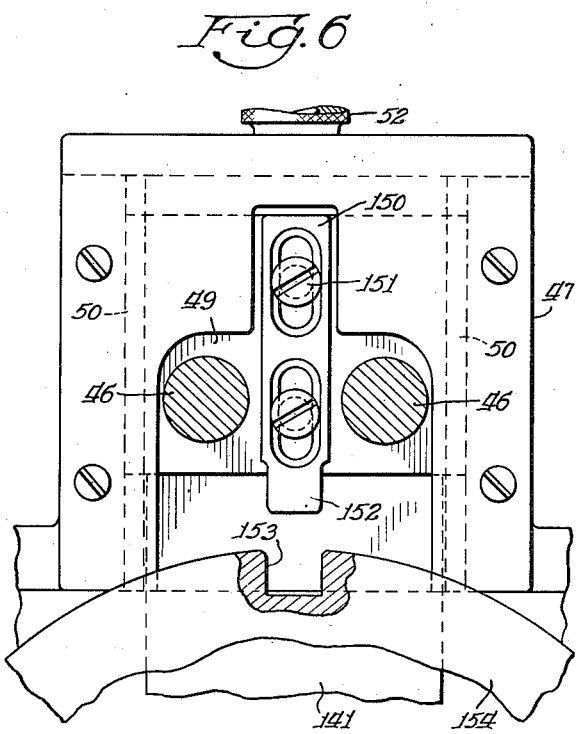
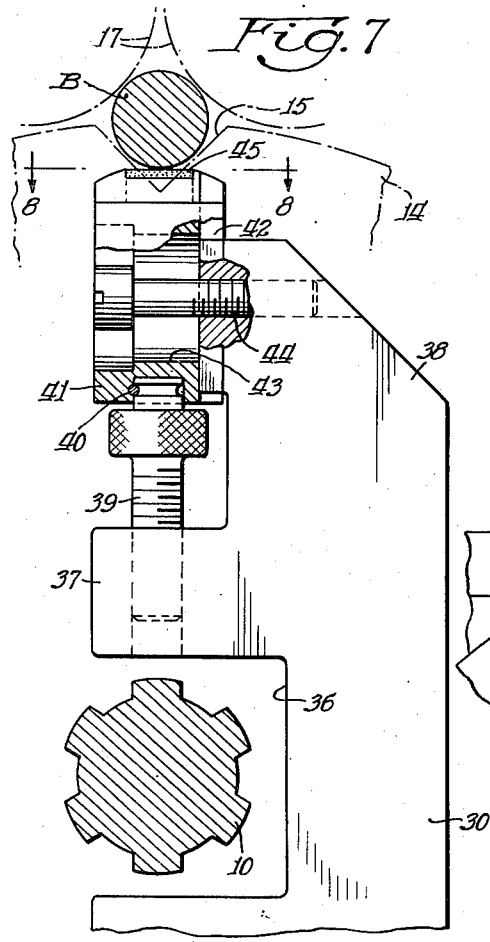
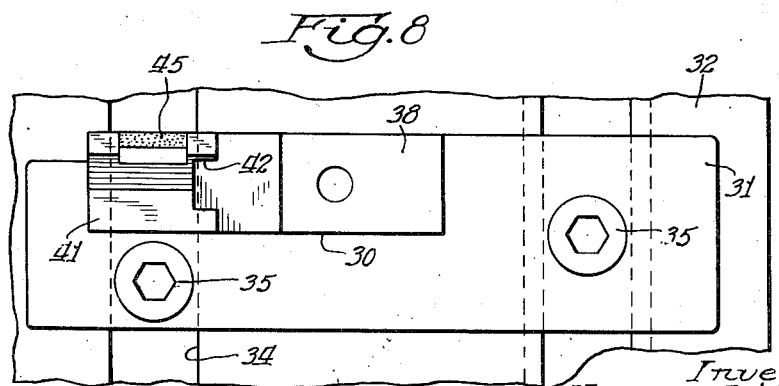
Inventors:
Harry Noble Baney
Louis Allen Cooper Slentz
Arlo A. Kirkpatrick & Charles E. Brickley
By: Edward C. Fritzlaugh Atty.

Nov. 21, 1950　　　　　H. N. BANEY ET AL　　　　　2,531,317
SHAFT CONCENTRICITY TESTING AND ASSORTING MACHINE
Filed March 2, 1948　　　　　　　　　　　　　　6 Sheets-Sheet 6
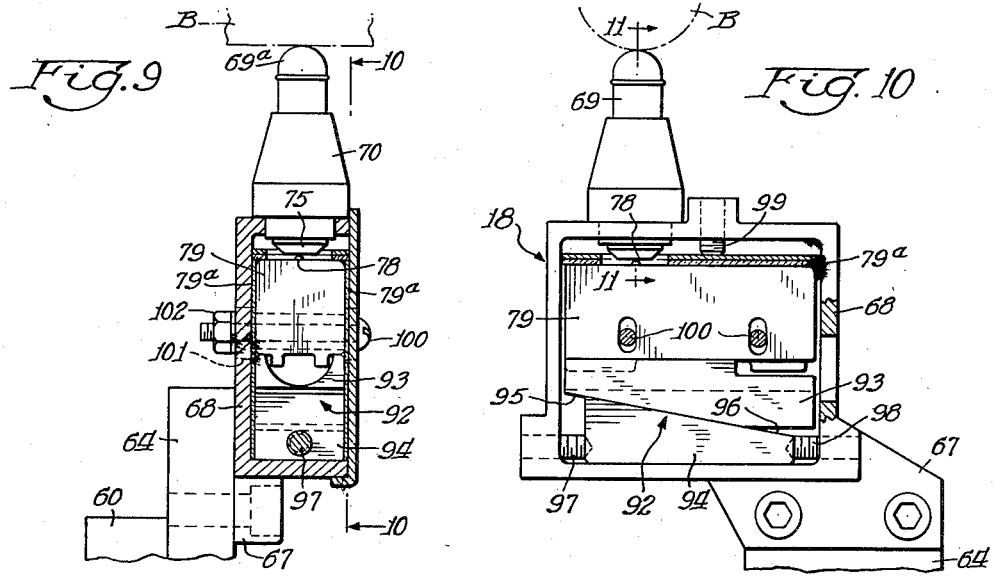
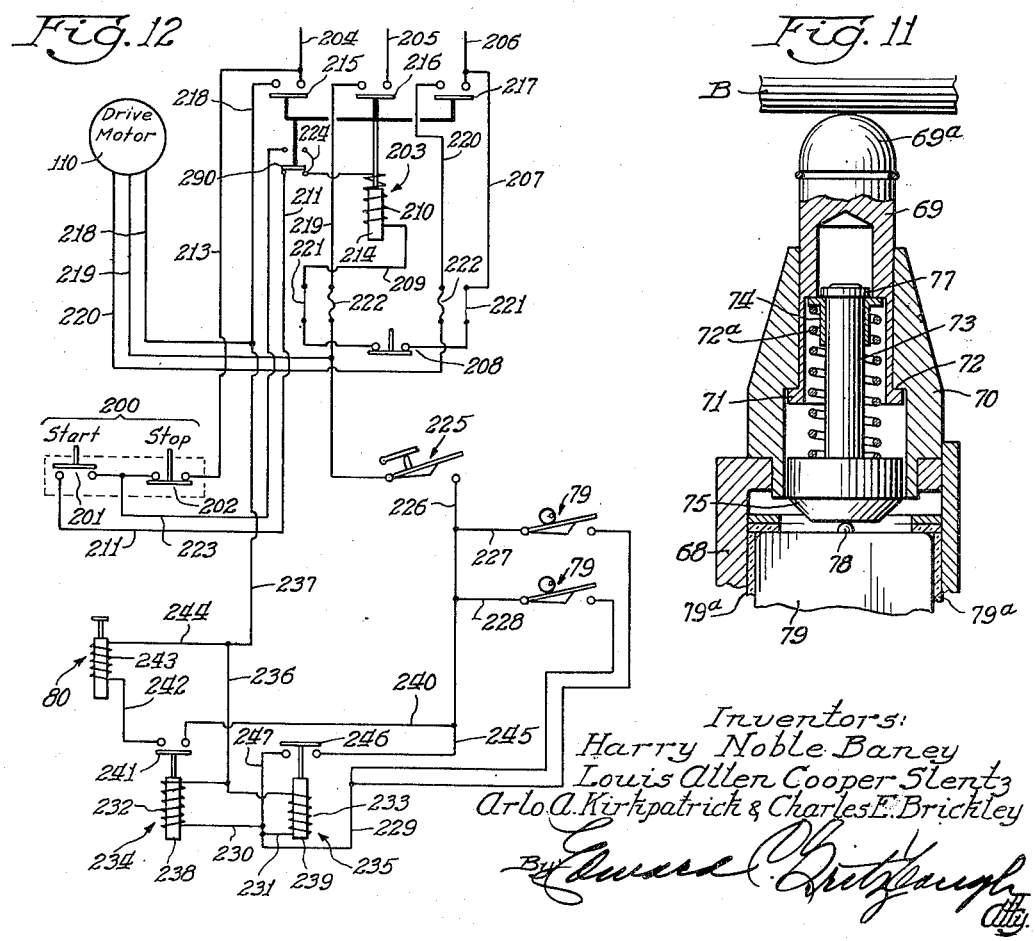
Inventors:
Harry Noble Baney
Louis Allen Cooper Slentz
Arlo A. Kirkpatrick & Charles E. Brickley Patented Nov. 21, 1950

2,531,317

UNITED STATES PATENT OFFICE 2,531,317

SHAFT CONCENTRICITY TESTING AND ASSORTING MACHINE

Harry N. Baney, Louis Allen Cooper Slentz, Arlo A. Kirkpatrick, and Charles E. Brickley, Muncie, Ind., assignors to Borg-Warner Corporation, Chicago, Ill., a corporation of Illinois Application March 2, 1948, Serial No. 12,514

12 Claims. (Cl. 209—82)

1

This invention relates to machines for testing the concentricity or curvature of cylindrical surfaces of articles, such as shafts and the like.

The principal object of this invention is to provide a machine for testing the concentricity of cylindrical surfaces of articles, such as shafts, and which machine is fully automatic in operation.

Another object of this invention is to provide an automatic testing machine of the type described employing improved means for checking the concentricity or curvature of the cylindrical surfaces of articles, such as shafts, including means for positioning the articles in predetermined relation to a device adapted to indicate eccentricity of the surfaces.

A further object of this invention is to provide an automatic testing machine of the type described incorporating mechanism for checking the concentricity of the cylindrical surfaces of articles, mechanism for feeding the articles to the checking mechanism for testing and for removing the tested articles from the checking mechanism, and indexing mechanism operative to control the operation of the feeding and checking mechanisms in sequence.

Another object of this invention is to provide a machine for testing the concentricity of cylindrical surfaces of articles of various lengths and different diameters.

A further object of this invention is to provide an automatic machine of the type described incorporating electrically controlled means for indicating eccentricity of the cylindrical surfaces of articles.

Still another object of this invention is to provide an automatic machine of the type described embodying electrically controlled means for separating articles having eccentric cylindrical surfaces and articles having concentric cylindrical surfaces into two different groups.

Our invention consists of the novel constructions, arrangements and devices to be hereinafter described and claimed for carrying out the above stated objects and such other objects as will appear from the following detailed description of a certain preferred embodiment of the invention illustrated in the accompanying drawings, wherein:

Fig. 1 is a top plan view of a machine embodying the principles of our invention;

Fig. 2 is a longitudinal sectional view of the machine taken along the lines 2—2 of Figs. 1 and 3;

Fig. 3 is a transverse sectional view of the machine taken along line 3—3 of Fig. 1;

Fig. 4 is a side elevational section of a portion of the indexing mechanism of the machine, said view being taken in the plane indicated by line 4—4 of Fig. 3;

2

Fig. 5 is a sectional view of another portion of the indexing mechanism of the machine taken along line 5—5 of Fig. 2;

Fig. 6 is a side elevational view of a portion of the testing or checking mechanism taken along line 6—6 of Fig. 3 illustrating a sliding lock;

Fig. 7 is a sectional view of another portion of the checking and testing mechanism illustrating an adjustable device for supporting a shaft in checking position, said view being taken along line 7—7 of Fig. 3; and Fig. 8 is a top view thereof taken in the plane indicated by line 8—8 of Fig. 7;

Fig. 9 is a transverse sectional view of another portion of the checking mechanism taken along line 9—9 of Fig. 2 and illustrating a shaft-contacting plunger and an electric switch arrangement actuable thereby;

Fig. 10 is a longitudinal sectional view thereof taken along line 10—10 of Fig. 9; and Fig. 11 is another enlarged transverse sectional view thereof taken along line 11—11 of Fig. 10;

Fig. 12 is a diagrammatic view of the electrical control system of the machine.

The machine shown for purpose of illustration comprises a frame having a bed or base 1, as shown in Figs. 2 and 3, having spaced upwardly extending support portions or standards designated 2, 3 and 4, the standard 2 being connected to the bed or base by bolts, as shown and the standard 3 being in the form of a wall integral with the base. The standard 4 is connected by means of a dovetail joint 5 to the base 1 for sliding movement transversely of the machine toward and from the standard 3. For this purpose, the base of the standard 3 is provided with a rack 6 engageable with a pinion 7 rotatably mounted on the bed or base 1 and rotatable by a handle 8 fixed to a hub extension of the pinion. When the standard 4 has been moved to obtain a desired spaced relation between the standards 3 and 4, the standard 4 may be fixed to the bed 1 by bolts 9 threaded into the base of the standard 4 and engageable with the bed 1. The adjustment of the standard 4 relative to the standard 3 is for a purpose later to be described. A shaft 10 is rotatably mounted in the standards 2 and 3 and is adapted to be driven by a motor through the medium of a pulley arrangement described hereinafter.

Briefly referring to the various components of feeding, checking and indexing mechanisms of the machine prior to their detailed description, the feeding mechanism is adapted to deliver the shafts to the checking mechanism and comprises a feed hopper or chute 12 (Figs. 1 and 2) receiving the shafts A to be checked or inspected, shaft-feeding members or cams 13 extending upwardly in openings at opposite ends of the table 12 and operatively connected to the indexing mechanism for delivering the shafts A one at a time to a pair of spaced wheels 14 adjacent the wall 3 and standard 4 and fixed to the shaft 10, said wheels having notches 15 in their peripheries for simultaneously receiving a shaft from the chute 12, presenting a shaft B to the checking mechanism for inspection of its cylindrical surface, delivering the checked shaft, indicated at C, to a delivery chute 12a, during rotation of the wheels.

The mechanism for checking or testing the concentricity of the cylindrical surfaces of the shafts comprises a pair of devices generally indicated at 16, 16 for supporting a shaft B at opposite ends thereof during the checking cycle of the machine, a plurality of rotatable rollers 17 engageable with the shaft B for rotating the same, and a pair of mechanically-operated electric switch devices generally indicated at 18, 18 disposed in spaced relation to each other, and intermediate the shaft-supporting devices 16, 16 for the purpose of determining and indicating eccentricity of the cylindrical surfaces of the shafts being inspected, such as the shaft B.

The indexing mechanism functions to provide a plurality of cycles of machine operation including, a shaft-feeding cycle and a shaft-checking cycle. In the shaft-feeding cycle and referring to Fig. 2, the cams 13 are actuated to deliver a shaft A to notches 15 in the wheels 14 and the wheels 14 are rotated to move the shaft X to the checking position previously occupied by B, the rotation of the wheels causing the shaft B to move to the position of the shaft C for delivery to the delivery chute 12a, the rollers 17, 17 being raised during rotation of the wheels to permit such delivery of the shaft B to the delivery chute 12a and to allow shaft X to be moved into position above the checking devices 18, 18. During the shaft checking cycle, the wheels 14, 14 are held against rotation and the rollers are lowered to engage and rotate the shaft to be inspected for checking by the devices 18, 18 which, in the event the cylindrical surface of the shaft is eccentric, will effect operation of an electrically-controlled device to indicate the shaft is defective in a manner hereinafter described.

The indexing mechanism operative during the shaft-feeding cycle comprises an eccentric device indicated 19 (Figs. 2 and 5) operating toggle motion linkage generally indicated 20 for actuating the cams 13 to feed the shafts A one at a time to the rotatable wheels 14, a double cam device 21 (Figs. 2, 3 and 4) actuating a pawl and ratchet mechanism 22 for effecting rotation of the wheels 14 for the purpose described. The indexing mechanism also comprises a slide device indicated generally at 23 and cooperating with the cam device 21 to raise and lower the rotating rollers 17, the rollers being raised during the rotation of the wheels 14 to deliver the tested shaft C to the delivery chute 12a and to bring a shaft, such as the shaft B, into position for inspection and the rollers thereafter being lowered to rotate the shaft B during the inspection cycle.

Describing the feeding and indexing mechanisms in detail, the feeding mechanism comprises the chute 12 (Figs. 1 and 2) fixed to side walls 1a and 1b of the frame and inclined toward the wheels 14 for permitting the shafts A to be fed by gravity to the notches 15 in the wheels 14. A plate 24 is mounted at opposite ends thereof on shafts 25, 25 slidable vertically in bosses 26, 26 formed on the side walls 1a and 1b of the machine frame for adjustment of the plate relative to the table 12 for the purpose of permitting the feed to be adjusted to any desired height to accommodate any desired diameter of shafts which are to be inspected and to maintain the shafts in a single layer as they are fed to the cams 13. Upon adjustment of the plate 24, it may be located by clamping the shafts 25 to the frame sidewalls by set screws, as shown in Fig. 1.

The cams 13 are mounted on a shaft 27 (Fig. 2) rotatably disposed in the side walls of the frame and each cam is formed with a notch to provide jaw 28 receiving opposite ends of a shaft A, the part 28a of each jaw preventing movement of the shaft A toward the wheels 14 in the position of the cams shown in Fig. 2 and adapted, upon rotation of the cams in a clockwise direction to permit the shaft to roll down the table 12 toward the wheels 14, another part 28b of the jaw being interposed between the released shaft and the next shaft A to prevent release of the latter shaft. It will be apparent that return of the cams 13 to their original positions will move each of the jaw parts 28b thereof below the chute 12 and cause the parts 28a of the jaws to engage the latter shaft A.

Referring to the shaft-carrying wheels 14, these wheels are splined to the shaft 10 and rotate with the shaft, during each shaft-feeding cycle, to deliver the shaft B, after checking, to the table 12a and bring a shaft X into the checking position previously occupied by the shaft B. The wheels 14 are axially adjustable on the shaft 10 to permit shafts of different lengths to be carried adjacent their ends by the wheels. After such adjustment, the wheels are fixed against axial movement by radially disposed set screws threaded into the wheels and engaging the shaft 10 as clearly shown in Fig. 2. It may be noted that the notches 15 in each of the wheels 14 are circumferentially disposed in spaced relation and are of V-shape to pick up, carry and permit the ready release of the shafts, as well as to accommodate shafts of different diameters to be inspected. As shown in Figs. 1 and 3, an annular disc 29 is provided adjacent each of the wheels 14 and these discs engage opposite ends of the shafts X, B and C to prevent longitudinal movement thereof. The discs are splined to the shaft 10 and are axially slidable on the shaft 10 for adjustment to engage the opposite ends of shafts of different lengths, the plates being fixed to the shaft 10 in the same manner as the wheels 14.

Referring now to the mechanism for checking the concentricity of the cylindrical surfaces of the shaft B, the devices indicated at 16, 16 are identical in structure and cooperate with the notches in the wheels 14, 14, receiving the shaft B, to support the shaft B during the checking of the concentricity of the cylindrical surface of the shaft B by the devices 18, 18. As shown in Figs. 3 and 7, each of the devices 16, 16 comprises a column 30 having a base 31 connected to a pedestal portion 32 of the frame by means of nuts 33, disposed in channels 34, 34 in the top of pedestal 32, and bolts 35 extending through the base and threaded into the nuts 33. The channels 34, 34 extend from one end to the other of the pedestal to permit adjustment of the columns 30 transversely of the machine for the purpose of disposing the devices 16, 16, adjacent respective wheels 14 upon adjustment of the wheels 14 and discs 29 to accommodate shafts of different lengths. The columns may be fixed to the pedestal 32 by engaging the threaded ends of the bolts 35, 35 with the bottoms of the channels 34, 34 in the pedestal 32, as shown in Fig. 3. Each column 30 is formed with a recess 36 through which extends the shaft 10 and at its upper end is formed with angularly offset portions 37 and 38, the portion 37 having threaded engagement with a thumb screw 39 extending within and connected by means of a lock ring 40 to a movable block 41 slidably engaging a side of the column portion 38. The block 41 has a tongue and groove connection 42 with the column portion 38 and is provided with a vertically extending elongate opening 43 receiving a bolt 44 in threaded engagement with the column portion 38 to clamp the block 41 to the column portion 38. As shown in Figs. 7 and 8, each block 41 is provided on its top surface with an opening for receiving a flat piece 45 of wear-resistant material, such as tungsten carbide, adapted to support the adjacent ends of the shaft B. It will be apparent that the blocks 41 may be adjusted vertically by actuation of the thumb screws 39 so that the upper surfaces of the flat pieces 45 may be disposed in alignment with each other and with the notches 15 in the wheels 14 to support a shaft to be inspected, such as the shaft B, each of the ends of the shaft being supported directly on the flat pieces 45 and maintained in engagement with the pieces 45 by the V-shaped notches 15 in the wheels 14 during rotation of the shaft B by the rollers 17. After such adjustment of the blocks 41, the bolts 44 may be utilized to clamp the blocks to the associated columns 30, 30. It will be noted that, in the event the shaft-supporting pieces 45 become worn, the bolts 44 may be rotated to permit the blocks 41 to be moved upwardly to engage the shaft B. Also the blocks 41 may be suitably adjusted to permit engagement of the pieces 45 with shafts of different diameters received within the notches 15 of the wheels 14.

During the inspection of the shaft B, the rollers 17 rotate the shaft and, for this purpose, are made of rubber. It may be noted from an inspection of Fig. 1, that three rollers 17 are utilized to rotate the shaft B, two of the rollers being on one side of the shaft and one on the opposite side of the shaft to insure the rollers holding the shaft B against the flat shaft-supporting pieces 45 during rotation of the shaft B. The rollers are fixed on shafts 46 extending through a hollow housing 47 having laterally extending base portions secured to the top of the wall 3 of the frame by bolts as shown in Figs. 1 and 2. Referring to Fig. 4, the housing 47 is of inverted U-shape construction and the shafts are rotatably mounted in a bearing block 49 received within the housing. To regulate the pressure of the drive rollers 17 on the shaft B, as well as for the purpose of vertically moving the rollers 17 into and out of engagement with the shaft B, the bearing block 49 is vertically movable through the medium of tongue and groove connections 50, 50 to the vertical portions of the housing 47 and the block is connected to one end of a threaded member 51 extending through the horizontal top portion of the housing and having a nut 52 connected thereto to adjust the tension of springs 53, disposed between the block and the housing, and thereby the pressure of the rollers on the shaft B, a lock nut 54 being engageable with the nut 52 to prevent undesired rotation of the nut 52. The bearing block 49 is vertically movable for the purpose described above by the cam and slide devices 21 and 23 of the indexing mechanism in a manner explained hereinafter. Each of the shafts 46 has a pulley wheel 55 fixed thereto driven by a belt 56.

The devices 18, 18 used for checking the concentricity of the cylindrical surface of the shaft B are identical and referring first to Figs. 1, 2 and 3 each comprises a column 60 having a base 61 with a portion thereof extending into one of the channels 34 in the pedestal 32 of the frame for sliding movement transversely of the machine. Bolts 62 have their heads located in the channel 34 and serve as guides for such movement of the columns 60 transversely of the machine and each of the bolts 62 has its threaded end extending upwardly through the base 61 of the associated column to receive a nut 63 for clamping the base and thereby the column to the frame pedestal 32. As seen in Fig. 2, each of the columns 60 extends upwardly at one side of the shaft 10 and a block 64 (Fig. 3) is slidably mounted in a groove in the side of the column for vertical movement. The block 64 is provided with an elongate opening (not shown) receiving threaded members 65, 65 (Fig. 2) fixed to the column 60 and adapted to have threaded thereon thumb nuts 66, 66 for fixing the block in an adjusted position on the column for a purpose later to be described. At the upper end of each block 64, a bracket 67 is fixed thereto and supports a casing 68 over the shaft 10 and beneath the shaft B and rollers 17.

Referring to Figs. 9, 10 and 11, each of the devices 18, 18 further comprises a hollow plunger 69 reciprocably mounted within a tubular member 70 having one end extending within and fixed to the top wall of the casing 68, the plunger 69 having a flanged end 71 engageable with a shoulder 72 on the member 70 to limit upward movement of the plunger by a spring 72a surrounding a pin 73 and having one end thereof engaging a flanged end of a sleeve 74 receiving the pin 73 and having its other end engaging the head of the pin 73 and a member 75 connected thereto and guiding the pin. To limit downward movement of the pin 73 due to the action of the spring, a washer 77 is riveted to the upper end of the pin 73 and engages the flanged end of the sleeve 74. The member 75 is engaged with a button 78 of an electric switch 79. The switch 79 is enclosed by pieces 79a of fibre, or other dielectric material, which insulate the switch from the metallic casing 68. It will be apparent that downward movement of the plunger 69 will move the sleeve 74 thereby compressing the spring which will effect movement of the pin 73 and thereby the button 78 of the switch 79 to close contacts in the switch for establishing electrical circuits energizing a solenoid 80 (Figs. 2 and 12). The plunger 69 is returned to its original position by the action of the spring against the member 75 and sleeve 74. It will be noted the spring connection between the plunger actuated mechanism prevents damage to the switch which might occur if the plunger acted directly on the switch button.

During testing of the concentricity of the cylindrical surfaces of the shafts, the spherical tips 69a of the plungers 69 engage the shaft to be inspected and, during the rotation of the shaft by rollers 17, any slight variation in the concentricity of the cylindrical surface of the shaft will cause actuation of one or the other of the plungers 69 and thereby the associated switch button 78 to close circuits described hereinafter for energizing the solenoid 80 (Fig. 2) whereby the core 81 of the solenoid 80 will be pulled downwardly to effect actuation of a lever 82 pivotally connected thereto and to a plate 83, forming a portion of the delivery chute 12a, to cause the plate 83 to tilt about its pivotal connections 84 to adjacent side walls of the frames (Fig. 1), as shown in dotted lines in Fig. 2. After the inspection cycle, rotation of the shaft 10 and thereby wheels 14 will occur and the defective shaft will roll out of the notches in the wheels 14 down an inclined member 85 and then will fall through an opening in the table 12a, normally closed by the plate 83, into a reject bin or receptacle 86 fixed in any suitable manner to the frame of the machine. The member 85 is connected to a standard 87 slidably mounted in a channel 34 in the pedestal 32 of the frame, extending transversely of the machine through the connection of its base 88 to the pedestal 32 in a manner similar to that of the columns 60 of the inspection devices 18, 18.

Upon deenergization of the solenoid 80, springs 89 and 90 connected to the stationary portion of the table 12a and to the lever 82 will raise the solenoid core 81 and return the lever 82 and plate 83 to their original positions. It will therefore be apparent that in the event the shaft being inspected has an eccentric cylindrical surface (outside of certain allowed tolerances) that either of the devices 18, 18 of the inspection or checking mechanism is operative to set in motion reject mechanism indicating to the operator of the machine that the shaft is defective and directing the defective shaft to the receptacle 86.

In checking the concentricity of the cylindrical surfaces of the shafts, travel of the plungers 69 of .0003 inch or less will make and break the contacts of the switches. However, it is necessary to compensate for the small lost motion of the plunger-actuated structure provided by the spring connection of the parts, which may be between .003 and .005 inch, to insure making and breaking of the switch contacts with such minute travel of the plungers. As previously described, the block 64 of the device 18 may be adjusted vertically to position the plunger 69 in engagement with the shaft B. However, it will be apparent this coarse adjustment of the testing devices 18, 18 is inadequate to compensate for the aforesaid lost motion had in the plunger-actuated structure. Accordingly, it has been found desirable to use the wedge arrangement 92 shown in Figs. 9 and 10. More particularly, the wedge arrangement 92 comprises a pair of wedges 93 and 94 positioned within the casing 68, the wedge 93 engaging the bottom of the switch 79 and having a wedge surface 95 in engagement with a wedge surface 96 on the wedge 94 seated on the bottom wall of the casing 68. Wedge 94 is movable between the end walls of the casing by means of adjusting screws 97 and 98 threaded into said walls and engaging the wedge 94 at opposite ends thereof. It will be apparent that rotation of the adjusting screws 97 and 98 will cause the wedge 94 to slide on the bottom wall of the casing 68 and move the wedge 93 and thereby the switch 79 vertically minute distances through the medium of the cooperating wedge surfaces 95 and 96. A set screw 99 is threaded into the top wall of the casing and engages the switch 79 to prevent upward movement of the switch when in adjusted position. It may also be noted that a pair of bolts 100 extend through vertically elongate slots 101 in the side walls of the casing 68, as shown in Fig. 2, and through openings in the switch 79, the bolts having nuts 102 threaded on their outwardly extending ends for fixing the switch 79 in its adjusted position.

Referring to Figs. 2-6, inclusive, the indexing mechanism there shown for effecting the shaft-feeding, and inspection cycles of the machine comprises a motor 110 (Fig. 4) connected by a belt and pulley arrangement 111 to a speed reducer generally indicated 112 having a pulley 113 driving a belt 155 which passes around a pulley 156 mounted on a shaft 157. The belt 56 which serves to drive the wheels 55 passes around the pulley 156 and also around a belt tightening pulley 114 mounted on one end of a lever 115 pivoted at 116 to the frame of the machine and connected intermediate its ends to a spring 117 secured at one end thereof to the side wall of the frame. Fixed to the shaft are eccentrics or cams 118 and 119 constituting the cam device 21. The cam 119 is engageable with a roller 120 rotatably mounted on a lever 121 pivoted at 122 to the column 3 of the machine frame as shown in Fig. 3. The lever 121 is connected above the pivot point 122, to one end of a spring 123 having its other end connected to the side wall of the frame to constantly urge the roller 120 into engagement with the cam 119. The lever 121 forms a portion of the pawl and ratchet mechanism indicated at 22 in Fig. 4 and the upper portion of the lever is formed with a detent 124 abutting one of the teeth 125 on a ratchet wheel 126 fixed to the shaft 10. Pivotally connected as at 127 to the upper portion of the lever is a pawl 128 urged into abutment with another tooth 125 of the ratchet wheel 126 by a torsion spring 129 coiled about studs on the pawl 128 and having engagement with the top of the lever 121.

In the position of the parts in Fig. 4, the shaft B has just been moved into position for testing by the devices 18, 18 and the surface 130 of the lobe on the cam 119 is in engagement with the roller on the lever 121 to position the lever with its detent 124 in abutment with a tooth 125 of the ratchet wheel, the rollers 17 being raised at this time. The pulley 113 is continually rotated by the belt 56 and the surface 130 of the cam 119 is effective to maintain the pawl and ratchet device 22 stationary and thereafter to move the same outwardly during engagement of the rollers 120 with the surfaces 131 and 132 of the cam 119 during which time the shaft B is rotated one or more revolutions by the rollers 17 for checking the concentricity of the cylindrical surface of the shaft by the devices 18, 18, rotation of the ratchet wheel 126, wheels 14 and shaft 10 being prevented by holding means later described. At the end of this period, the roller 120 of the lever 121 travels along the angularly inclined surface 131a, of the lobe on the cam 119 for effecting operation of the pawl and ratchet device 22 to rotate the wheels 14 to release the inspected shaft and bring a shaft to be inspected into position above the devices 18, 18 and beneath the rotating rollers. More particularly, movement of the roller 120 along the surfaces 131 and 132 of the cam 119 will effect movement of the upper portion of the lever to the right to remove the detent 124 from the engaged ratchet wheel tooth 125 and the pawl 128 will be withdrawn from the engaged ratchet wheel tooth 125 and be rotated about the pivot point 127 by the springs 129, 129 to an extent determined by the pin and slot connection of the pawl and the lever 121, said connection comprising a pin 133 fixed to the lever 121 received within a slot 134 in the pawl 128. Such pivotal movement of the pawl 128 will be effective to cause the pawl 128 to engage the next tooth disposed in a counter-clockwise direction on the ratchet wheel 126. Upon engagement of the roller 120 with the angularly inclined surface 131a and surface 130 on the lobe of the cam 119, the lever will be rotated to cause the pawl, through its engagement with the tooth of the ratchet wheel, to rotate the ratchet wheel and thereby the shaft 10 to revolve the wheels 14 to release the inspected shaft and position the shaft to be inspected above the devices 18, 18. Thereafter, the detent 124 on the lever 121 will become effective to engage one of the teeth 125 of the ratchet wheel and cooperate with the pawl 128 engaging another tooth of the ratchet wheel.

The cam 118 is instrumental in operating the slide device 23 which is adapted to engage the bearing block 49, mounting the shafts 36 carrying the rollers 17, for raising the block and thereby the rollers 17 during rotation of the shaft-carrying wheels 14 and to lower the rollers 17 into engagement with the shaft being inspected to rotate the shaft during the inspection cycle of the machine. To obtain this desirable result, the cam 118 is engageable with a roller 140 connected to a sliding member 141 adapted, during the time of indexing the machine to bring a new shaft into position for inspection, to maintain the rollers 17 in a raised position and to permit lowering the rollers 17 during the inspection cycle. For this purpose, the member 141 is provided with a reduced portion slidably received within a bracket 142 fixed to the wall 3 of the frame 1 and is provided with an elongate opening 143 through which the shaft 10 extends. The upper end of the member 141 is received within a bracket 144 fixed to the frame wall 3. The cams 118 and 119 are so coordinated that the rollers 17 will be disposed in raised position during rotation of the wheels 14 and will be in lowered position to drivingly engage the shaft to be inspected when the wheels 14 are stationary as will be presently described. Therefore, upon rotation of the cam 118, the eccentric surface 118a of the cam will be effective to cause the sliding member 141 to move upwardly to engage the bearing block 49 to raise the rollers 17 from the shaft B before and after the inspection cycle of the machine, the cam 118 being of a formation suitable to perform this operation and also to permit the sliding member 141 and the block 49 to be urged downwardly by the compressed springs 53 to engage the rollers with the shaft to be inspected. It will be apparent that the spring 123 will pull the lever 115 to exert tension on the belt 56 to continuously drive the pulleys 55, 55 and thereby the rollers 17 and also the pulley 113 and thereby the cams 118 and 119 during the operation of the machine.

In order to insure that the driving rollers 17 will not rotate the shaft-supporting wheels 14 during the inspection of a shaft, the bearing block 49 has connected to one side thereof a plate 150 (Fig. 6) through which the shafts 46, 46 carrying the rollers 17 extend, the plate 150 being secured to the bearing block 49 by means of screws 151 and having a downwardly extending tooth or latch 152 adapted to be received in one of the notches 153 in a wheel 154 (Fig. 3) having a splined connection to the shaft 10. Each of the notches 153 in the wheel 154 is aligned with notch 15 in the adjacent wheel 14 and accordingly, the tooth 152 will enter into one of the notches 153 in the wheel 154 when the rollers 17 are lowered into engagement with the wheels 14, 14 to prevent rotation of the wheels 14, 14 by the rotating rollers 17 through the medium of the shaft being inspected during the inspection cycle.

Describing the operation of the cams 118 and 119 to effect the cooperative movement of the pawl and ratchet mechanism 22 and slide device 23 for indexing the shaft-feeding and inspection cycles of the machine, as previously stated with reference to the position of the parts in Fig. 4, the cam 119 has its surface 130 engaged with the roller 120 of the mechanism 22 and the shaft has just been moved to inspection position and it will be noted that, at this time, the surface 118a of the cam 118 is at its high point and, therefore, the slide member 141 is in its raised position so that the rollers 17 are not engaged with the shaft.

As the cams 118 and 119 continue rotating, the roller 139 will roll along the surfaces 131 and 132 of the cam 119 to cause the pawl 128 and detent 124 of the pawl and ratchet mechanism to be withdrawn from the ratchet wheel 126 and become engaged with the next adjacent teeth in a counter-clockwise direction. During this time, the roller 140 on the slide member 141 will travel from the highest to the lowest point on the surface 118a of the cam 118 and, accordingly, the slide member will be lowered to engage the rollers 17 with the shaft to be inspected to rotate the shaft. It may be noted that the sliding latch 153, carried by the bearing block 49, will also be lowered and received within one of the notches 153 in the wheel 154 to prevent rotation of the shaft-carrying wheels 14, 14 during the rotation of the rollers 17 and the shaft in the inspection period.

After the inspection of the shaft, the surface 131a of the cam 119 will engage the roller 139 of the lever 121 to cause the pawl 128 to rotate the ratchet wheel 126 and thereby the shaft-carrying wheels 14, 14 to release the inspected shaft and bring another shaft into inspecting position above the testing devices 18, 18. During this time, the roller 140 of the slide member 141 will roll along the surface 118a of the cam 118 or gradually increasing radius to move the bearing block 49 and thereby the rollers 17 to raised position out of contact with the inspected shaft being released and another shaft being brought into inspecting position. The foregoing cycle is then repeated.

As previously described, the speed reducer 112 is operative to drive a belt and pulley arrangement to drive the belt 56 drivingly connected to the pulley 113 rotating the shaft 157 and thereby the cams 118 and 119, the belt 56 also driving the pulley 114, as well as the pulleys 55 driving the rollers 17. The speed reducer 112 drives the belt 56 through the medium of a belt 155 which drivingly engages a pulley 156 (Figs. 2 and 3) keyed to the shaft 157 to which the pulley wheel 113 is connected. The shaft 157 is rotatably mounted in the standard 2 and wall 3 of the machine frame and at one end thereof is fixed a sprocket wheel 158 comprising a portion of the indexing mechanism for effecting operation of the cams 13 to permit feeding of one of the shafts at a time from the table 12 to notches 15 in the shaft-carrying wheels 14.

The sprocket wheel 158 is connected by means of a chain 159 to another sprocket wheel 160 (Figs. 2 and 5) rotatably mounted in the sidewall 1a of the machine and operatively connected to a toggle arrangement 20 comprising links 161 and 162 being connected to a link 163, the link 161 being also connected to the side wall 1a of the machine frame and the link 162 being also connected to a lever 164 splined to the shaft 127 on which is fixed the cam members 13. The sprocket wheel 160 is provided with an eccentric pin 165 connected to the lever 163. Motion of the links 161 and 162 by the link 163 and its eccentric connection to the sprocket wheel 160 will impart a reciprocating motion to the cam 13 to release one of the shafts A and allow it to roll down the table 12 to the wheels 14 while restraining movement of the other shafts toward the wheels 14 in the manner previously described. The toggle arrangement 20 functions continuously during the operation of the machine and is adapted to feed one of the shafts to the wheels 14 in coordinated relation with the operation of the pawl and ratchet mechanism 22 and slide device 23 controlled by the cams 118 and 119 of the indexing mechanism so that the cams 13 will be operated to release one of the shafts A upon initiation of rotation of the wheels 14 by the pawl and ratchet device 22.

In the operation of the machine, and considering first the condition of the various parts of the feeding and indexing mechanisms as shown in Figs. 1, 2 and 3; it will be assumed the shaft B is being rotated by the rollers 17 to check the concentricity of the cylindrical surface of the shaft by the testing devices 18, 18; the shafts A were restrained against rolling downwardly on the chute 12 toward the wheels 14 by the cams 13; the shaft X is disposed within notches 15 of the wheels 14 at the bottom of the table 12; and the inspected shaft C is rolling down the inclined member 85 as, it will be presumed, its surface has been found to be eccentric and, therefore, defective by the testing devices 18 so that the solenoid 80 has been energized to effect tilting of the plate 83, as shown in dotted lines in Fig. 2, to permit the defective shaft C to roll into the receptacle 86. After the period of one second allowed for the inspection cycle has elapsed, the cams 118 and 119 will effect upward movement of the slide member 141 (Fig. 4) to raise the block 49 and thereby the rollers 17 from the shaft B and thereafter the pawl and ratchet device 23 of the indexing mechanism 21 will become effective to rotate the wheels 14 to bring the shaft X into position above the testing devices 18, 18 and to release the tested shaft B for movement onto the delivery chute 12a. Upon initiation of the rotation of the wheels 14 by the device 21, the toggle arrangement 20 will be actuated by the eccentric 19 to permit one of the shafts A to roll down the chute 12 onto the periphery of the wheels 14 between the notches 15 therein; further rotation of the wheels 14 causing the released shaft A to occupy the next adjacent notches disposed in a counterclockwise direction. A spring 161a is provided to assist the return of the toggle mechanism to its raised position, as shown in Fig. 2. The shaft-feeding and inspection cycles of the machine are thus automatically controlled by the indexing mechanism so that the machine is fully automatic in operation.

Referring now to Fig. 12, the electrical control system there shown is utilized for starting and stopping the motor 110 and for energizing the solenoid 80 to tilt the plate 83, forming a portion of the table 12A; in the event one of the plungers 69 of the testing devices 18, 18 is actuated by an eccentric cylindrical surface of a shaft being tested to effect movement of either of the buttons 78 of the switches 79 to close contacts in the switch establishing an electric circuit to energize the solenoid 80 controlling the lever 82 for tilting the plate 83. Referring more particularly to Fig. 12, a push-button station 200 is provided on the machine having a start switch 201 and a stop-switch 202. Upon closing the contacts of the start switch a circuit will be established energizing a solenoid 203 which establishes electrical circuits including the power lines 204, 205 and 206 for energizing the drive motor 110. The circuit for energizing the solenoid 203 extends from the power line 206 to the conductor 207, the contacts of emergency stop switch 208, conductor 209, solenoid coil 210, conductor 211, the closed contacts of start switch 201, the closed contacts of stop-switch 202, conductor 213, to the power line 204. Upon energization of the solenoid 203, the solenoid core 214 will be moved upward and the armatures 215, 216, 217, secured thereto will connect the power lines 204, 205, 206, to the conductors 218, 219, and 220 for energizing the motor 110. To prevent damage to the drive motor 110 in case of an overload, heater elements 221, 221 connecting the conductors 207 and 209 in the solenoid-energizing circuit will be heated to a sufficient extent to cause the adjacent fuses 222, 222, forming portions of the conductors 219 and 220, respectively, to disintegrate and thereby break the established circuits energizing the drive motor 110.

It will thus be seen that, upon pushing the button at the start switch 201 to close the contacts of the switch 201, the drive motor 110 will become energized to initiate operation of the indexing mechanism for establishing the shaft-feeding and inspecting cycles of the machine. In order that the machine may continue operation after release of the push-button by the operator, a holding circuit for maintaining the solenoid 203 energized is provided. This holding circuit is established at the time the solenoid is energized by the momentary operation of the push button to close the contacts of the switch 201 as the armature 290, connected to the solenoid core 214, will be moved upwardly to establish the holding circuit. This circuit comprises the conductor 213 connected to the power line 204, the switch 202, conductor 223, armature 290, conductor 224, solenoid coil 210, conductor 209, switch 208, conductor 207 to the power line 206.

Upon rotation of a shaft by the rollers 17 and in the event the cylindrical surface of the shaft is eccentric, either one or the other of the plungers 69 will be actuated to close the contacts of its associated switch 79 to establish a circuit energizing the solenoid 80 to effect tilting of the plate 83 so that the defective shaft will roll into the receptacle 86. It will be apparent that, if the cylindrical surface of the shaft being inspected is concentric or if it is eccentric within acceptable tolerances, solenoid 80 will not be actuated and the shaft will go down the entire length of the table 12a and be deposited in a suitable receptacle. The circuit for energizing the reject solenoid 80, upon closing of the contacts of either of the switches 79, comprises the conductor 219 connected to the power line 205 by the armature 216, the closed contacts of cam switch 225, conductor 226, conductor 227 or 228 dependent upon which of the contacts of the switches 79 are closed, conductor 229, conductors 230 and 231 and solenoid coils 232, 233 of the solenoids 234 and 235, respectively, connected in parallel to the conductors 229 and 236, conductors 236 and 237, conductor 218, armature 215 and power line 204. Upon energization of the solenoids 234 and 235, the cores 238 and 239 of said solenoids will be actuated to establish a circuit for energizing the reject solenoid 80. This circuit comprises the power line 205, armature 216, conductor 219, switch 225, conductor 226, conductor 240, armature 241 of the solenoid 234, conductor 242, coil 243 of the solenoid 80, conductor 244, conductor 237, armature 215, and power line 204. It will thus be apparent that, inasmuch as the switches 79 are connected in parallel between the conductors 226 and 229, closing of the contacts of either switch 79 will establish a circuit for energizing solenoid 80 to tilt the plate 83 to cause the defective shaft to roll into the receptacle 86. It may be noted that as soon as the defective shaft moves from inspecting position the closed contacts of the switch 79, actuated by the depressed plunger 69, will open and break the circuit energizing the solenoid 80 to make it possible for the plate 83 to return to its original position prior to the defective shaft being received in the receptacle 86. To prevent deenergization of the solenoid 80, a holding circuit for maintaining the solenoid energized is established, upon closing of the contacts of either of the switches 79, 79. This holding circuit extends from the power line 205, armature 216, conductor 219, switch 225, conductor 226, conductor 245 armature 246, conductor 247, coils 232 and 233 connected in parallel to the conductor 247 and conductor 236, conductor 236, conductor 237, armature 215 to the power line 204. This holding circuit for the solenoid 80 is broken upon opening of the contacts of the switch 225. It will thus be apparent that the electrical control system illustrated in Fig. 12 is operative to control the operation of the motor 110 and, upon engagement of either plunger 69 of the testing devices 18 with a defective shaft, effect energization of the solenoid 80 to tilt the plate 83, forming a portion of the delivery chute 12a to cause the defective shaft to roll into the reject bin 86.

As just described, the switch 225 is operative to insure deenergization of the solenoid 80 and thereby return of the plate 83, forming a portion of the table 12a, to its normal position (shown in full lines in Fig. 2) by the action of the springs 89 and 90. As shown in Fig. 2, the cam switch 225 is disposed adjacent the toggle linkage 20 of the indexing mechanism and the contacts of the switch are closed in the position of the parts of the linkage shown. Upon actuation of the linkage 20 to effect rotation of the shaft 27 and thereby the cams 13 to release a shaft to the drums 14, the arm 161 of the linkage will be urged downwardly by the link 163 and the arm 161 will actuate the switch 225 to open the contacts of the same. In the operation of the machine and considering a defective shaft has caused the energization of the solenoid 80 and thereby tilting of the plate portion 83 of the delivery chute 12a for reception of the shaft in the receptacle 86, the indexing mechanism is operative to effect rotation of the drums 14 to bring the next shaft to be inspected into testing position and to effect actuation of the toggle linkage 20 to release a shaft on the table 12 to the drums 14 and to open the contacts of the switch 225 to cause deenergization of the solenoid 80 and thereby return of the tilting plate 83 of the table 12a to its normal position before the testing of the shaft in testing position. Thus, the contacts of the cam switch 225 are opened to effect deenergization of the solenoid 80 prior to the testing of the shaft succeeding a defective shaft.

It will be apparent that we have provided a fully automatic machine for checking or testing the concentricity of the cylindrical surfaces of shafts. However, it will be understood the machine may be utilized for the testing of any articles having a cylindrical surface and various modifications and changes may be effected in the illustrated application without departing from the spirit of the invention or from the scope of the appended claims.

We claim:

1. A cyclicly operable gauging apparatus for gauging the cylindrical surfaces of articles including a rotary article-receiving conveyor capable of being periodically indexed and adapted upon successive indexing operations thereof to receive the articles at a receiving station, convey them to a gauging station, and from thence convey them to a discharge station, a feed chute at the receiving station, gauging means at the gauging station, a discharge chute at the discharge station for receiving the gauged articles, means for periodically indexing said conveyor whereby an article at the receiving station will be conducted to the gauging station while an article at the latter station will be simultaneously conducted to the discharge station and deposited in said discharge chute, an article support positioned at the gauging station in the path of movement of the articles and onto which said articles move upon arrival at the gauging station, means operable upon initiation of each indexing operation for releasing an article from the feed chute and depositing the same on the conveyor, said gauging means comprising a gauging unit cooperating with said support for gauging the article at the gauging station, a continuously rotatable friction roller movable toward and away from said support into and out of engagement with an article at said gauging station, and means operable upon each indexing operation of the conveyor for bodily moving said roller away from said support and out of engagement with an article at the gauging station to permit the article to be conducted to the discharge station and for thereafter bodily moving said roller toward said support and into frictional engagement with the next succeeding article arriving at the gauging station for rotating the same during the gauging operation.

2. A cyclicly operable gauging and sorting apparatus for gauging and sorting the cylindrical surfaces of articles including a rotary article-receiving conveyor capable of being periodically indexed and adapted upon successive indexing operations thereof to receive the articles at a receiving station, convey them to a gauging station, and from thence convey them to a discharge station, a feed chute at the receiving station, gauging means at the gauging station, a sorting device at the discharge station, a reject bin at said discharge station into which abnormal articles are adapted to be ejected from the conveyor by said sorting device, means for periodically indexing said conveyor whereby an article at the receiving station will be conducted to the gauging station while an article at the latter station will be simultaneously conducted to the discharge station, a stationary article support positioned at the gauging station in the path of movement of the articles and onto which said articles move upon arrival at the gauging station, means operable upon initiation of each indexing operation for releasing an article from the feed chute and depositing the same on the conveyor, said gauging means comprising a gauging unit cooperating with said support for gauging the article at the gauging station, a continuously rotatable friction roller movable toward and away from said support into and out of engagement with an aticle at said gauging station, means operable upon each indexing operation of the conveyor for bodily moving said roller away from said support and out of engagement with an article at the gauging station to permit the article to be conducted to the discharge station and for thereafter bodily moving said roller toward said support and into frictional engagement with the next succeeding article arriving at the gauging station for rotating the same during the gauging operation, and means operable under the control of said gauging means for selectively actuating said sorting device.

3. A cyclicly operable gauging and sorting apparatus for gauging and sorting the cylindrical surfaces of articles including a rotary article-receiving conveyor capable of being periodically indexed and adapted upon successive indexing operations thereof to receive the articles at a receiving station, convey them to a gauging station, and from thence convey them to a discharge station, a feed chute at the receiving station, gauging means at the gauging station, a discharge chute at the discharge station for receiving the gauged articles, a reject bin disposed adjacent said discharge chute, a sorting plate carried by said discharge chute and movable from a normally closed position to an open position wherein an abnormal article discharged from said conveyor at the discharge station is conducted to said reject bin, means for periodically indexing said conveyor whereby an article at the receiving station will be conducted to the gauging station while an article at the latter station will be simultaneously conducted to the discharge station and deposited in said discharge chute, a stationary article support positioned at the gauging station in the path of movement of the articles and onto which said articles move upon arrival at the gauging station, means operable upon initiation of each indexing operation for releasing an article from the feed chute and depositing the same on the conveyor, said gauging means comprising a gauging unit cooperating with said support for gauging the article at the gauging station, a continuously rotatable friction roller at said gauging station movable toward and away from said support, means operable upon each indexing operation of the conveyor for bodily moving said roller away from said support and out of engagement with an article at the gauging station to permit the article to be conducted to the discharge station and for thereafter bodily moving said roller toward said support and into frictional engagement with the next succeeding article arriving at the gauging station for rotating the same during the gauging operation, and means operable under the control of said gauging means for actuating said sorting plate.

4. A cyclicly operable gauging and sorting apparatus for gauging and sorting the cylindrical surfaces of articles including a rotary article-receiving conveyor capable of being periodically indexed and adapted upon successive indexing operations thereof to receive the articles at a receiving station, convey them to a gauging station, and from thence convey them to a discharge station, a feed chute at the receiving station, gauging means at the gauging station, a discharge chute at the discharge station for receiving the gauged articles, a reject bin disposed adjacent said discharge chute, a sorting plate carried by said discharge chute and movable from a normally closed position to an open position wherein an abnormal article discharged from said conveyor at the discharge station is conducted to said reject bin, means for periodically indexing said conveyor whereby an article at the receiving station will be conducted to the gauging station while an article at the latter station will be simultaneously conducted to the discharge station and deposited in said discharge chute, a stationary article support positioned at the gauging station in the path of movement of the articles and onto which said articles move upon arrival at the gauging station, means operable upon initiation of each indexing operation for releasing an article from the feed chute and depositing the same on the conveyor, said gauging means comprising a gauging unit cooperating with said support for gauging the article at the gauging station, a continuously rotatable friction roller at said gauging station movable toward and away from said support, means operable upon each indexing operation of the conveyor for bodily moving said roller away from said support and out of engagement with an article at the gauging station to permit the article to be conducted to the discharge station and for thereafter bodily moving said roller toward said support and into frictional engagement with the next succeeding article arriving at the gauging station, and a solenoid connected to said sorting plate and operable upon energization thereof to move the sorting plate to its open position, an electrical circuit for said solenoid, said gauging unit including a normally open switch in said circuit and operable when an abnormal article is encountered at the gauging station to become closed and complete the circuit through said solenoid.

5. In an apparatus for gauging the cylindrical surfaces of articles, a rotary drum-like article-receiving conveyor capable of being periodically indexed and adapted upon successive indexing operations thereof to receive the articles at a receiving station, convey them to a gauging station, and from thence convey them to a discharge station, a feed chute at the receiving station, gauging means at the gauging station, a discharge chute at the discharge station for receiving the gauged articles, a plurality of peripheral recesses formed in said conveyor and movable upon indexing of the latter successively into alignment with said feed chute at the receiving station to receive an article therein and into alignment with the discharge chute to deposit a gauged article therein, an article support positioned at the gauging station in the path of movement of the articles and onto which said articles move upon arrival at the gauging station, means for adjusting the position of said support to accommodate articles of different diameter and to premit articles on the support to engage the sides of said recesses for confining purposes, said gauging means comprising a gauging unit cooperating with said support for gauging the articles at the gauging station, a continuously rotatable friction roller at said gauging station adapted to bear against each article and by frictional contact therewith rotate the latter in said recesses and on said support during the gauging operation.

6. A cyclicly operable gauging and sorting apparatus for gauging and sorting the cylindrical surfaces of articles including a rotary article-receiving conveyor capable of being periodically indexed and adapted upon successive indexing operations thereof to receive the articles at a receiving station, convey them to a gauging station, and from thence convey them to a discharge station, a feed chute at the receiving station, gauging means at the gauging station, a sorting device at the discharge station, a reject bin at said discharge station into which abnormal articles are adapted to be ejected from the conveyor by said sorting device, means for periodically indexing said conveyor whereby an article at the receiving station will be conducted to the gauging station while an article at the latter station will be simultaneously conducted to the discharge station, a stationary article support positioned at the gauging station in the path of movement of the articles and onto which said articles move upon arrival at the gauging station, means operable upon initiation of each indexing operation for releasing an article from the feed chute and depositing the same on the conveyor, said gauging means comprising a gauging unit cooperating with said support for gauging the article at the gauging station, means at said gauging station for rotating the articles to be gauged during the gauging operation, and means operable under the control of said gauging means for selectively actuating said sorting device.

7. A cyclicly operable gauging and sorting apparatus for gauging and sorting the cylindrical surfaces of articles including a rotary article-receiving conveyor capable of being periodically indexed and adapted upon successive indexing operations thereof to receive the articles at a receiving station, convey them to a gauging station, and from thence convey them to a discharge station, a feed chute at the receiving station, gauging means at the gauging station, a discharge chute at the discharge station for receiving the gauged articles, a reject bin disposed adjacent said discharge chute, a sorting plate carried by said discharge chute and movable from a normally closed position to an open position wherein an abnormal article discharged from said conveyor at the discharge station is conducted to said reject bin, means for periodically indexing said conveyor whereby an article at the receiving station will be conducted to the gauging station while an article at the latter station will be simultaneously conducted to the discharge station and deposited in said discharge chute, a stationary article support positioned at the gauging station in the path of movement of the articles and onto which said articles move upon arrival at the gauging station, means operable upon initiation of each indexing operation for releasing an article from the feed chute and depositing the same on the conveyor, said gauging means comprising a gauging unit cooperating with said support for gauging the article at the gauging station, means at said gauging station for rotating the articles to be gauged during the gauging operation, and means operable under the control of said gauging means for actuating said sorting plate, a solenoid connected to said sorting plate and operable upon energization thereof to move the sorting plate to its open position, an electrical circuit for said solenoid, said gauging unit including a normally open switch in said circuit and operable when an abnormal article is encountered at the gauging station to become closed and complete the circuit through said solenoid.

8. A cyclicly operable gauging and sorting apparatus for gauging and sorting the cylindrical surfaces of articles including a rotary article-receiving conveyor capable of being periodically indexed and adapted upon successive indexing operations thereof to receive the articles at a receiving station, convey them to a gauging station, and from thence convey them to a discharge station, a feed chute at the receiving station, gauging means at the gauging station, a discharge chute at the discharge station for receiving the gauged articles, a reject bin disposed adjacent said discharge chute, a sorting plate carried by said discharge chute and movable from a normally closed position to an open position wherein an abnormal article discharged from said conveyor at the discharge station is conducted to said reject bin, means for periodically indexing said conveyor whereby an article at the receiving station will be conducted to the gauging station while an article at the latter station will be simultaneously conducted to the discharge station and deposited in said discharge chute, a stationary article support positioned at the gauging station in the path of movement of the articles and onto which said articles move upon arrival at the gauging station, means operable upon initiation of each indexing operation for releasing an article from the feed chute and depositing the same on the conveyor, said gauging means comprising a gauging unit cooperating with said support for gauging the article at the gauging station, a continuously rotatable friction roller at said gauging station movable toward and away from said support, means operable upon each indexing operation of the conveyor for bodily moving said roller away from said support and out of engagement with an article at the gauging station to permit the article to be conducted to the discharge station and for thereafter bodily moving said roller toward said support and into frictional engagement with the next succeeding article arriving at the gauging station for rotating the same during the gauging operation, means operable under the control of said gauging means for moving said sorting plate to its open position when an abnormal article is encountered at said gauging station, and time delay means for maintaining said sorting plate in its open position after the gauging operation has been completed until such time as the gauged abnormal article arrives at said receiving station.

9. A cyclicly operable gauging and sorting apparatus for gauging and sorting the cylindrical surfaces of articles including a rotary article-receiving conveyor capable of being periodically indexed and adapted upon successive indexing operations thereof to receive the articles at a receiving station, convey them to a gauging station, and from thence convey them to a discharge station, a feed chute at the receiving station, gauging means at the gauging station, a discharge chute at the discharge station for receiving the gauged articles, a reject bin disposed adjacent said discharge chute, a sorting plate carried by said discharge chute and movable from a normally closed position to an open position wherein an abnormal article discharged from said conveyor at the discharge station is conducted to said reject bin, means for periodically indexing said conveyor whereby an article at the receiving station will be conducted to the gauging station while an article at the latter station will be simultaneously conducted to the discharge station and deposited in said discharge chute, a stationary article support positioned at the gauging station in the path of movement of the articles and onto which said articles move upon arrival at the gauging station, means operable upon initiation of each indexing operation for releasing an article from the feed chute and depositing the same on the conveyor, said gauging means comprising a gauging unit cooperating with said support for gauging the article at the gauging station, a continuously rotatable friction roller at said gauging station movable toward and away from said support, means operable upon each indexing operation of the conveyor for bodily moving said roller away from said support and out of engagement with an article at the gauging station to permit the article to be conducted to the discharge station and for thereafter bodily moving said roller toward said support and into frictional engagement with the next succeeding article arriving at the gauging station for rotating the same during the gauging operation, a solenoid connected to said sorting plate and operable upon energization thereof to move the sorting plate to its open position, an electrical circuit for said solenoid, said gauging unit including a normally open switch operable when an abnormal article is encountered at the gauging station to become closed and complete the circuit through said solenoid, and a holding circuit for maintaining said solenoid circuit effective during movement of the abnormal article from said gauging station to said discharge station.

10. In a cyclicly operable gauging apparatus for gauging the cylindrical surfaces of elongated articles at axially spaced points therealong, a rotary spool-like conveyor having article-supporting discs at opposite ends thereof adapted to receive thereon the ends of the articles to be gauged with the articles bridging the distance between said discs, said conveyor being capable of being periodically indexed and adapted on successive indexing operations to receive the articles at a receiving station, convey them to a gauging station, and from thence convey them to a discharge station, an article support positioned at the gauging station in the path of movement of the articles and onto which said articles move upon arriving at the gauging station, said support being positioned between said discs and serving to support the medial portions of the article at the gauging station, a feed chute at the receiving station, a discharge chute at the discharge station for receiving the gauged articles, means for periodically indexing said conveyor whereby an article at the receiving station will be conducted to the gauging station while simultaneously an article at the latter station will be conducted to the discharge station and deposited in said discharge chute, means operable upon initiation of each indexing operation for releasing an article from the feed chute and depositing the same on the conveyor, said gauging means comprising a plurality of movable gauging fingers located at spaced points axially along the articles to be gauged and each positioned to contact a surface of the article to be gauged, and means at said gauging station for rotating the articles during the gauging operation.

11. In a cyclicly operable gauging apparatus for gauging and sorting the cylindrical surfaces of articles, a supporting frame-work, a drum-like conveyor mounted in said frame-work for revolution about a horizontal axis, said conveyor being capable of being periodically indexed and adapted upon successive indexing operations thereof to receive the articles at a receiving station, convey them to a gauging station, and from thence convey them to a discharge station, a feed chute at the receiving station, gauging means at the gauging station, a discharge chute at the discharge station for receiving the gauged articles, means for periodically indexing said conveyor whereby an article at the receiving station will be conducted to the gauging station while an article at the latter station will be simultaneously conducted to the discharge station, an article support positioned at the gauging station in the path of movement of the articles and onto which said articles move upon arrival at the gauging station, means operable upon initiation of each indexing operation for releasing an article from the feed chute and depositing the same on the conveyor, a plurality of rotatable friction rollers at said gauging station movable bodily in unison toward and away from said support, a pulley connected to each friction roller, a main driving pulley, a belt passing around said pulleys of a length providing a substantial slack portion, means operable during each indexing operation of the conveyor for bodily moving said rollers as a unit away from said support and out of engagement with an article at the gauging station to permit the article to be conducted to the discharge station and for thereafter bodily moving said rollers as a unit toward said support and into frictional engagement with the next succeeding article arriving at the gauging station, and yieldable means operable during such bodily movement of said friction rollers for taking up the slack existing in said belt.

12. Apparatus for gauging the cylindrical surfaces of elongated tubular articles comprising, in combination, a rotary conveyor for receiving and conducting the articles successively from a receiving station to a gauging station and from thence to a discharge station, said conveyor including a pair of spaced disc-like members having pairs of aligned V-shaped notches in the periphery thereof adapted to receive therein the ends of the article to be gauged, a stationary article support positioned at the receiving station between said members and in the path of movement of the articles and onto which said articles move upon arrival at the gauging station, means for adjusting the position of said support radially with respect to said members in various positions of registry with each of said aligned pair of notches at the gauging station to accommodate positioning of an article at the gauging station with its cylindrical surface resting upon said support and engaging the sides of the notches, a plurality of friction rollers at said gauging station movable bodily toward and away from said support and adapted to bear against the cylindrical surface of an article at the gauging station to confine the same within said notches while at the same time rotating the article for gauging purposes, a gauging finger cooperating with said support and adapted to bear against the cylindrical surface of the article on the support to effect the gauging operation, means for periodically indexing said conveyor to conduct an article from the receiving station to the gauging station for gauging purposes and simultaneously to conduct a gauged article from the gauging station to the discharge station, and means operable when an article approaches the gauging station for moving said rollers bodily out of the path of movement of the oncoming article and for subsequently moving said rollers bodily into engagement with the next succeeding article at the gauging station.

HARRY N. BANEY.
LOUIS ALLEN COOPER SLENTZ.
ARLO A. KIRKPATRICK.
CHARLES E. BRICKLEY.

REFERENCES CITED

The following references are of record in the file of this patent:

UNITED STATES PATENTS

| Number | Name | Date |
| --- | --- | --- |
| 623,036 | Richmond | Apr. 11, 1899 |
| 939,109 | Switzer | Nov. 2, 1909 |
| 1,443,193 | Phelps | Jan. 23, 1923 |
| 1,818,968 | Anderson | Aug. 18, 1931 |
| 2,116,926 | Cramer | May 10, 1938 |
| 2,338,868 | Owens | Jan. 11, 1944 |
| 2,376,556 | Ruau | May 22, 1945 |
| 2,407,062 | Darrah | Sept. 3, 1946 |